(12) United States Patent
Takahashi et al.

(10) Patent No.: US 6,919,652 B2
(45) Date of Patent: Jul. 19, 2005

(54) NETWORK APPARATUS

(75) Inventors: Satoshi Takahashi, Osaka (JP);
Takashi Hirata, Osaka (JP); Hironori
Akamatsu, Osaka (JP); Yoshihide
Komatsu, Osaka (JP); Koichi
Sugimoto, Osaka (JP)

(73) Assignee: Matsushita Electric Industrial Co.,
Ltd., Osaka (JP)

( * ) Notice: Subject to any disclaimer, the term of this
patent is extended or adjusted under 35
U.S.C. 154(b) by 705 days.

(21) Appl. No.: 10/035,434

(22) Filed: Jan. 4, 2002

(65) Prior Publication Data

US 2002/0093248 A1 Jul. 18, 2002

(30) Foreign Application Priority Data

Jan. 18, 2001 (JP) .......................... 2001-009782

(51) Int. Cl.[7] ................................. H01H 3/26
(52) U.S. Cl. .................. 307/140; 327/65; 307/139;
307/115
(58) Field of Search ................. 307/140, 139;
327/65

(56) References Cited

U.S. PATENT DOCUMENTS 5,920,734 A 7/1999 Holmdahl

FOREIGN PATENT DOCUMENTS

JP 11-161444 6/1999

*Primary Examiner*—Robert L. DeBeradinis
(74) *Attorney, Agent, or Firm*—McDermott Will & Emery LLP (57) ABSTRACT

A network apparatus is provided, which allows another network apparatus to recognize the disconnection with reliability, if a power supply to the network apparatus is interrupted. A control unit operating with a first power supply outputs a first signal, which is level-converted and supplied as a second signal to an intermediate potential supply unit operating with a second power supply. In the intermediate potential supply unit, a switch receives a reset signal as a switch signal and outputs, when the power supply is interrupted, a ground potential to a driver instead of the second signal. As a result, an intermediate potential supplied to a cable is forcibly set to the ground potential.

14 Claims, 8 Drawing Sheets

NETWORK APPARATUS

BACKGROUND OF THE INVENTION

The present invention relates to a network apparatus which recognizes interconnection provided therebetween by holding a cable at a specified intermediate potential such as those used for an interface in accordance with, e.g., the IEEE Standard 1394. More particularly, the present invention relates to a technology for compensating for operation when a power supply is interrupted.

As a conventional network apparatus, there has been known a structure which recognizes the level of an intermediate potential supplied from another network apparatus connected thereto via a first cable and supplies an intermediate potential to a second cable such that the other network apparatus recognizes the level of the supplied intermediate potential, whereby the interconnection provided between the network apparatus is recognized (see, e.g., Japanese Patent Laid-Open Publication No. Hei 11-161444). In the network apparatus, if one of the interconnected network apparatus recognizes a halt in the supply of the intermediate potential from the other, the network apparatus disconnects itself from the other. If a power supply from the other network apparatus is initiated again, the network apparatus recognizes the connection again.

As a result of conducting studies, however, the present inventor has found that the conventional apparatus had the following problems.

The network apparatus is internally provided with a plurality of power supplies so that, in response to a control signal generated by one of the power supplies, an intermediate potential generated by another is supplied. In this case, if a power supply to the entire apparatus is interrupted, the control signal may become unsteady depending on potential reductions at the individual power sources irrespective of normal operation still performed by an intermediate potential supply unit.

Consequently, a current flows to the power supply for the intermediate potential supply unit via a cable through which the intermediate potential is supplied from another network apparatus connected to the network apparatus of concern so that additional power is supplied from the power supply to a driver supplying the intermediate potential. This causes the situation in which the level of the intermediate potential which should be lowered to the ground potential in principle is not lowered completely due to the additional power supplied from the other network apparatus.

As a result, the other network apparatus recognizes by mistake that the connection is still maintained since the level of the intermediate potential on the cable is higher than a specified value. In other words, the other network apparatus retains the recognition that the connected state is still maintained irrespective of the interruption of the power supply to the network apparatus of concern.

The other network apparatus respondingly tries an access to the network apparatus disconnected from the power supply by judging that the network apparatus is still active but the access cannot be made actually. This causes the problem that the network system is brought into an abnormal state.

SUMMARY OF THE INVENTION

It is therefore an object of the present invention to provide a network apparatus such that, if a power supply to the network apparatus is interrupted, another network apparatus that has been connected thereto and disconnected therefrom recognizes the disconnection with reliability.

In one aspect, a network apparatus according to the present invention is a network apparatus for receiving data via a first cable and transmitting data via a second cable, the apparatus comprising: a control unit operating with a first power supply and outputting a first signal; an intermediate potential supply unit operating with a second power supply, recognizing a level of an intermediate potential on the first cable, and supplying an intermediate potential to the second cable; a level converting unit for converting a level of the first signal in accordance with respective voltage levels at the first and second power supplies and outputting, as a second signal serving as a basis for the intermediate potential to be supplied to the second cable, a resulting signal to the intermediate potential supply unit; and loop interrupting means for forcibly setting the intermediate potential to a ground potential if a power supply to the network apparatus is interrupted.

According to the present invention, when the power supply to the network apparatus of concern is interrupted, the loop interrupting means forcibly sets, to the ground potential, the intermediate potential to be supplied to the second cable. This allows another network apparatus that has been connected to the network apparatus of concern and disconnected therefrom to recognize the disconnection with reliability.

Specifically, a network apparatus according to the present invention is a network apparatus for receiving data via a first cable and transmitting data via a second cable, the apparatus comprising: a control unit operating with a first power supply and outputting a first signal; an intermediate potential supply unit operating with a second power supply, recognizing a level of an intermediate potential on the first cable, and supplying an intermediate potential to the second cable; and a level converting unit for converting a level of the first signal in accordance with respective voltage levels at the first and second power supplies and supplying, as a second signal, a resulting signal to the intermediate potential supply unit, the intermediate potential supply unit comprising: a switch for receiving the second signal and a ground potential and selectively outputting either one of the second signal and the ground potential in accordance with a switch signal; and a driver for generating the intermediate potential to be supplied to the second cable in accordance with an output from the switch.

According to the present invention, when the switch is controlled by the switch signal to selectively output the ground potential, the ground potential is outputted from the driver so that the intermediate potential to be supplied to the second cable is forcibly set to the ground potential. By setting the switch signal such that the switch selectively outputs the ground potential when the power supply to the network apparatus is interrupted, e.g., another network apparatus that has been connected to the network apparatus and disconnected therefrom can recognize the disconnection with reliability.

In another aspect, a network apparatus according to the present invention is a network apparatus for receiving data via a first cable and transmitting data via a second cable, the apparatus comprising: a control unit operating with a first power supply and outputting a first signal; an intermediate potential supply unit operating with a second power supply, recognizing a level of an intermediate potential on the first cable, and supplying an intermediate potential to the second cable; a level converting unit for converting a level of the first signal in accordance with respective voltage levels at the first and second power supplies and outputting, as a second signal serving as a basis for the intermediate potential to be supplied to the second cable, a resulting signal to the intermediate potential supply unit; a diode for coupling the second cable to the first power supply; and a resistor provided between the first power supply and the ground.

According to the present invention, the second cable is coupled to the first power supply by the diode so that the potential at the first power supply lowers when the power supply to the network apparatus is interrupted. As a result, charge flows from the second cable to the first power supply. Since the first power supply is connected to the ground via the resistor, a float in the potential of the first power supply is suppressed. Accordingly, the potential on the second cable finally reaches the ground potential so that another network apparatus that has been connected to the network apparatus and disconnected therefrom recognizes the disconnection with reliability.

DETAILED DESCRIPTION OF THE INVENTION

Referring now to the drawings, the embodiments of the present invention will be described. It should be noted that detailed description of components having common basic functions may be omitted by retaining the same reference numerals in the drawings.

[First Embodiment]

Figure 1:
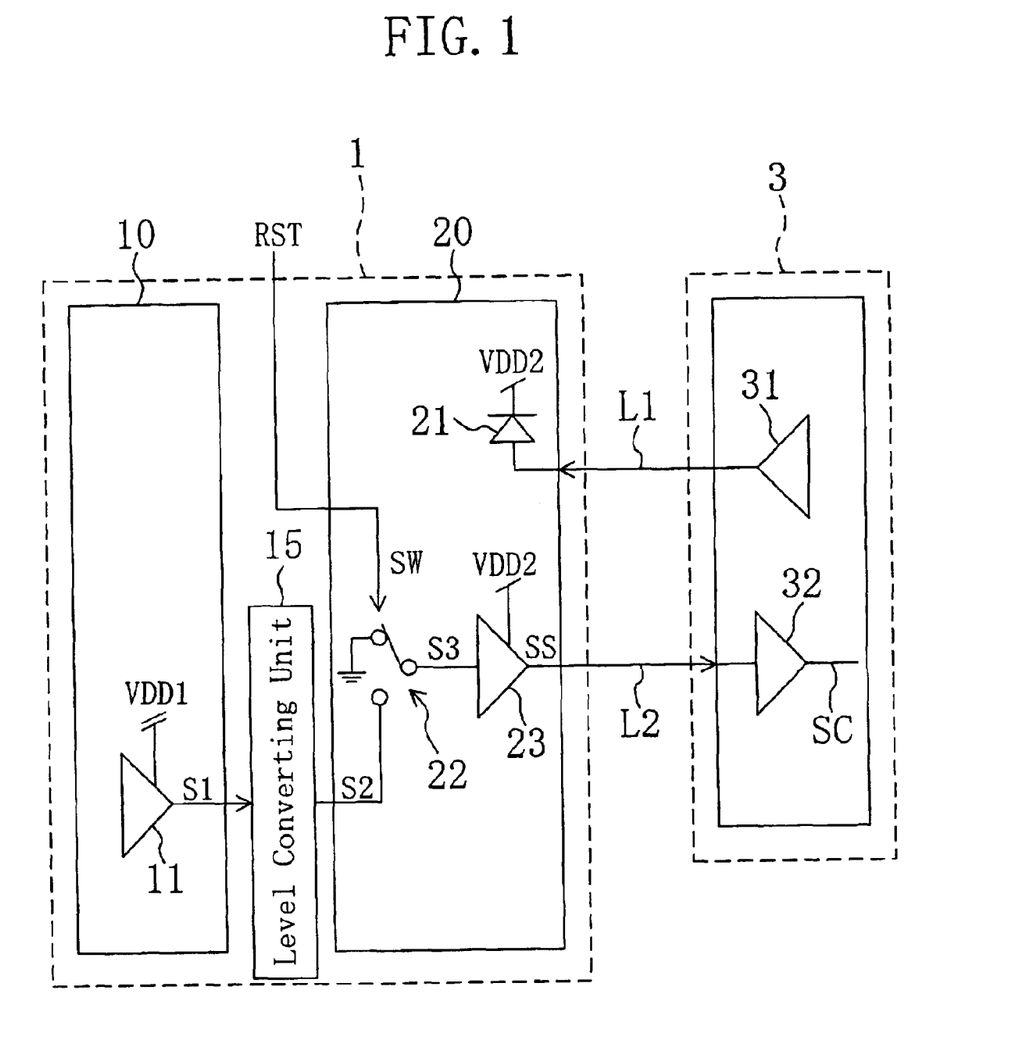
FIG. 1 shows a structure of a network apparatus according to a first embodiment of the present invention.

FIG. 1 shows a structure of a network apparatus according to a first embodiment of the present invention. In FIG. 1, reference numeral 1 denotes a first network apparatus corresponding to the network apparatus according to the present embodiment and 3 denotes a second network apparatus connected to the first network apparatus 1 via first and second cables L1 and L2. The network apparatus 1 receives data via the first cable L1 and transmits data via the second cable L2.

The first network apparatus 1 comprises: a control unit 10; a level converting unit 15; and an intermediate potential supply unit 20. The control unit 10 operates with a first power supply VDD1 and outputs a control signal S1 as a first signal through a control circuit 11. The intermediate potential supply unit 20 operates with a second power supply VDD2, recognizes an intermediate potential on the first cable L1, and supplies an intermediate potential to the second cable L2. The level converting unit 15 converts the level of the control signal S1 outputted from the control unit 10 in accordance with voltages levels at the first and second power supplies VDD1 and VDD2 and outputs, to the intermediate potential supply unit 20, an output control signal S2 as a second signal serving as the basis for the intermediate potential SS supplied to the second cable L2.

In the present specification, there are cases where the reference numerals VDD1 and VDD2 may represent power supplies or power-supply voltages. It is assumed here that the power-supply voltage from the first power supply VDD1 is 2.5 V and the power-supply voltage from the second power supply VDD2 is 3.3 V.

Figure 2:
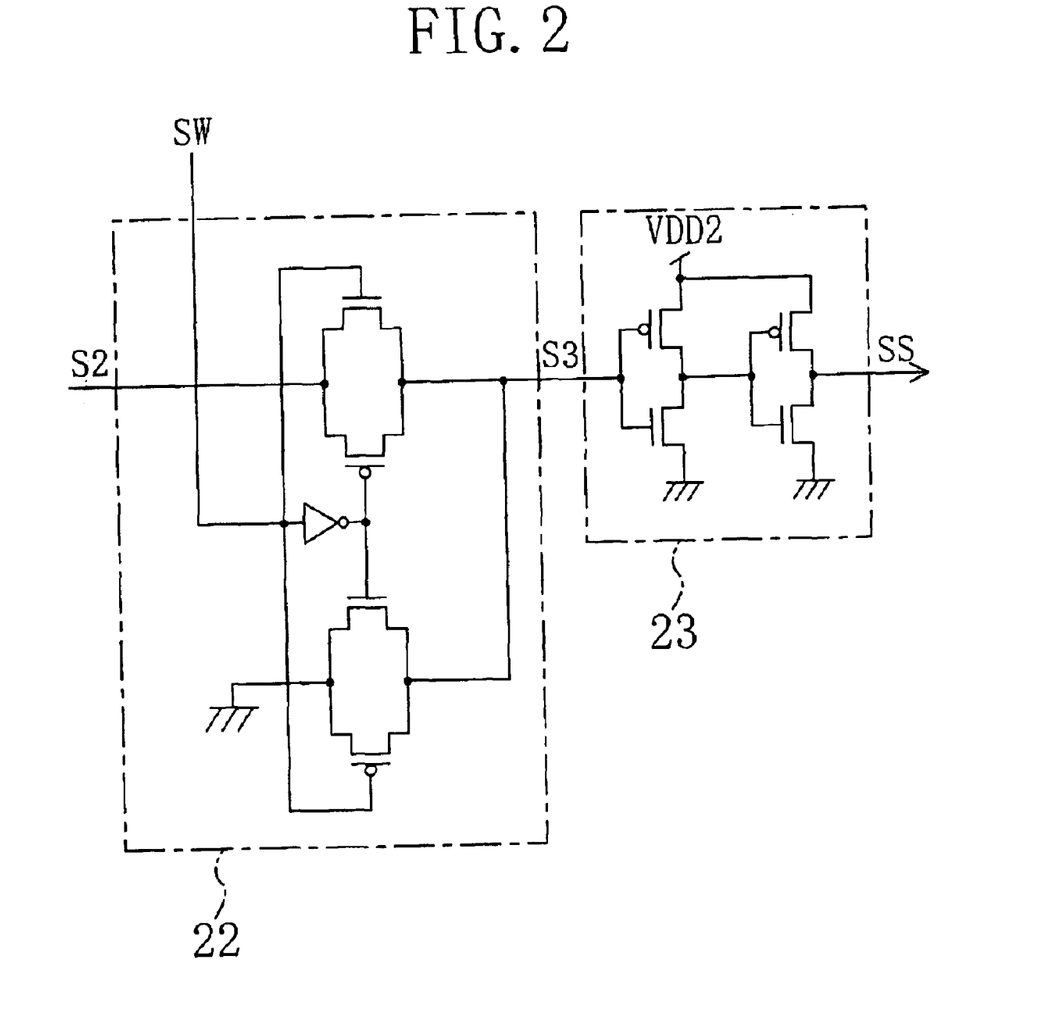
FIG. 2 is a circuit diagram showing an example of respective internal structures of a switch and a driver shown in FIG. 1.

The intermediate potential supply unit 20 comprises: a protective diode 21; a switch 22; and a driver 23. The protective diode 21 protects the first network apparatus 1 from a surge from the first cable L1 or the like. The switch 22 receives the output control signal S2 outputted from the level converting unit 15 and the ground potential and selectively outputs either one of the output control signal S2 and the ground potential as an intermediate potential control signal S3 in accordance with a switch signal SW. The driver 23 generates an intermediate potential SS (e.g., 1.8 V) supplied to the second cable L2 in accordance with an output from the switch 22, i.e., the intermediate potential control signal S3. FIG. 2 is a circuit diagram showing an example of respective internal structures of the switch 22 and the driver 23.

Here, a reset signal RST has been given from the outside of the first network apparatus 1 as the switch signal SW for controlling the switching of the switch 22. The reset signal RST is supplied from, e.g., a reset IC provided within a system including the first network apparatus 1.

The second network apparatus 3 comprises: a driver 31; and a connection detecting circuit 32. The driver 31 generates an intermediate potential supplied to the first cable L1. The connection detecting circuit 32 recognizes connection by the level of the intermediate potential on the second cable L2 (e.g., 0.8 V or more) and outputs a connection detect signal SC.

If each of the first and second network apparatuses 1 and 3 has been turned ON so that the network system is in the connected state, the intermediate potential on the second cable L2 is maintained by the driver 23 of the first network apparatus 1. On the other hand, the intermediate potential on the first cable L1 is maintained by the driver 31 of the second network apparatus 3. The detection of the intermediate potential on the second cable L2 by the connection detecting circuit 11 of the second network apparatus 3 allows the second network apparatus 3 to recognize the connection between itself and the first network apparatus 1. The connection detecting circuit 11 enables the connection detect signal SC if the intermediate potential on the second cable L2 becomes, e.g., 0.8 V or more.

A description will be given herein below to the operation of the network apparatus 1 shown in FIG. 1.

It is assumed here that the power supply to the first network apparatus 1 has been interrupted. At this time, the control signal S1 becomes unsteady in response to the interruption of the first power supply VDD1 and therefore the output control signal S2 outputted from the level converting unit 15 becomes unsteady. When the output control signal S2 that has become unsteady is supplied as the intermediate potential control signal S3 to the driver 23 via the switch 22, the intermediate potential SS generated by the driver 23 also becomes unsteady. In this case, the associated second network apparatus 3 cannot recognize the cable disconnection so that a loop of power supply via the first cable L1 as described in the background of the invention is formed undesirably.

To prevent this, the reset signal RST is inputted from the outside as the switch signal SW to be given to the switch 22. The reset signal RST is generated by, e.g., a reset IC such that it is enabled if a power supply voltage is reduced to a certain level or lower.

If the reset signal RST is enabled, the switch 22 as loop interrupting means selectively outputs the ground potential instead of the intermediate potential control signal S2. As a result, an input signal to the driver 23 is fixed to the ground potential and an output from the driver 23 is also set to the ground potential. Accordingly, the intermediate potential SS on the second cable L2 is forcibly set to the ground potential.

In the second network apparatus 3, the connection detecting circuit 11 disables the connection detect signal SC in response to the lowering of the intermediate potential SS on the second cable L2 to the ground potential so that the cable disconnection is recognized.

The following is the returning procedure when the resetting is cancelled. First, the reset signal RST is disabled so that the switch 22 returns to the normal operation and selectively outputs the signal S2. Then, the control unit 10 checks whether or not the cables L1 and L2 are connected. If they are connected, the intermediate potential SS is increased by raising the signal S1. Thereafter, initialization is performed with the associated network apparatus so that the normal state of connection is restored.

Thus, according to the present embodiment, if the power supply to the first network apparatus 1 is interrupted, the switch 22 as the loop interrupting means selectively outputs the ground potential instead of the output control signal S2 which becomes unsteady so that the intermediate potential SS supplied to the second cable L2 is forcibly set to the ground potential. This allows the second network apparatus 3 that has been connected to the first network apparatus 1 and disconnected therefrom to recognize the disconnection with reliability.

[Second Embodiment]

Figure 3:
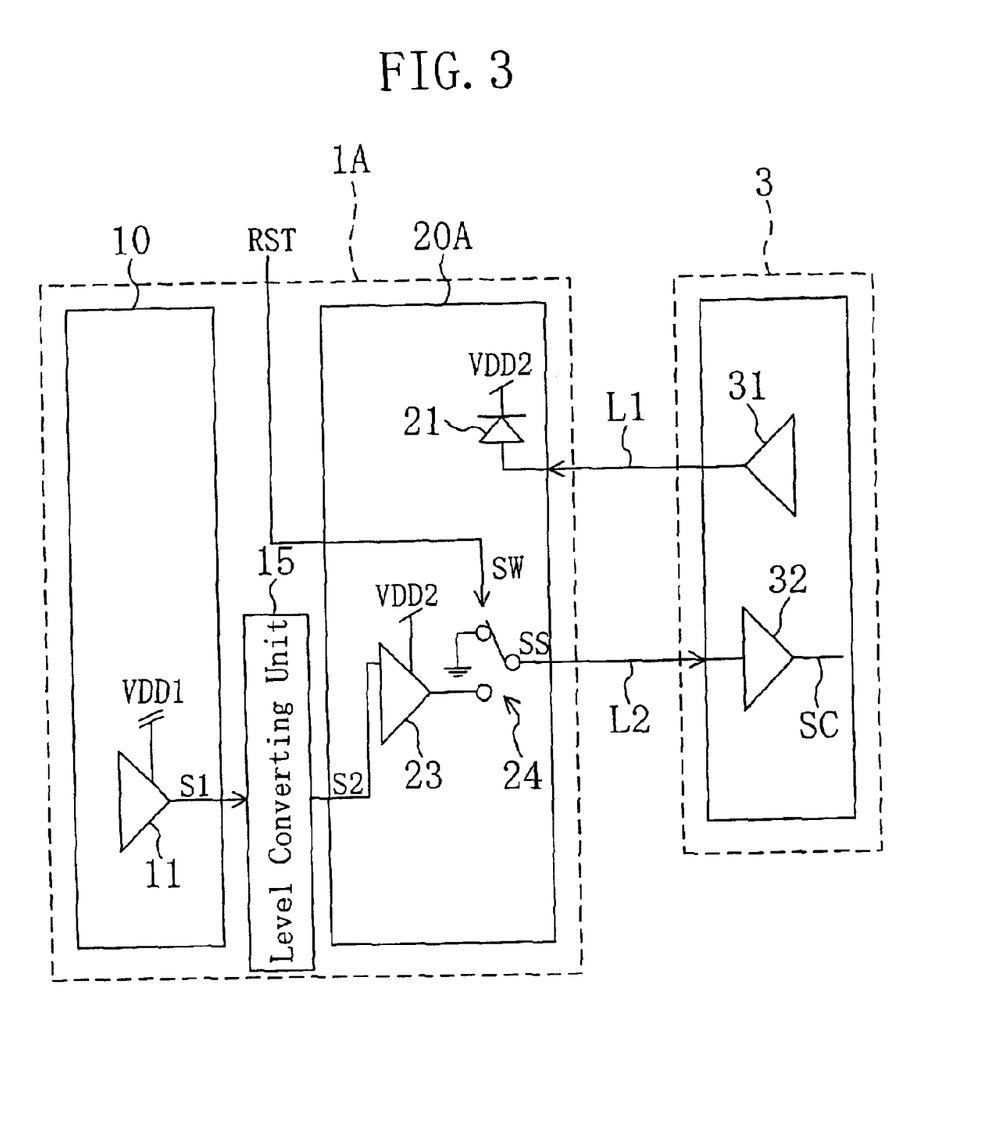
FIG. 3 shows a structure of a network apparatus according to a second embodiment of the present invention.

FIG. 3 shows a structure of a network apparatus according to a second embodiment of the present invention. In contrast to the structure of FIG. 1, the structure of FIG. 3 comprises, in place of the switch 22, a switch 24 provided in the stage subsequent to the driver 23 for generating the potential serving as the intermediate potential.

The switch 24 receives the potential generated by the driver 23 and the ground potential and selectively outputs either one of the potential generated by the driver 23 and the ground potential in accordance with the switch signal SW. As the switch signal SW, the reset signal RST is given from the outside, similarly to the first embodiment. When the reset signal RST is enabled, the switch 24 as the loop interrupting means outputs the ground potential instead of the output from the driver 23. Thus, the intermediate potential SS on the second cable L2 is set to the ground potential.

Since the switch 24 as the loop interrupting means selectively outputs the ground potential instead of the output from the driver 23 which becomes unsteady when the power supply to a first network apparatus 1A is interrupted, the intermediate potential SS on the second cable L2 is forcibly set to the ground potential. Thus, the present embodiment also allows the second network apparatus 3 that has been connected to the first network apparatus 1 and disconnected therefrom to recognize the disconnection with reliability.

Figure 4A:
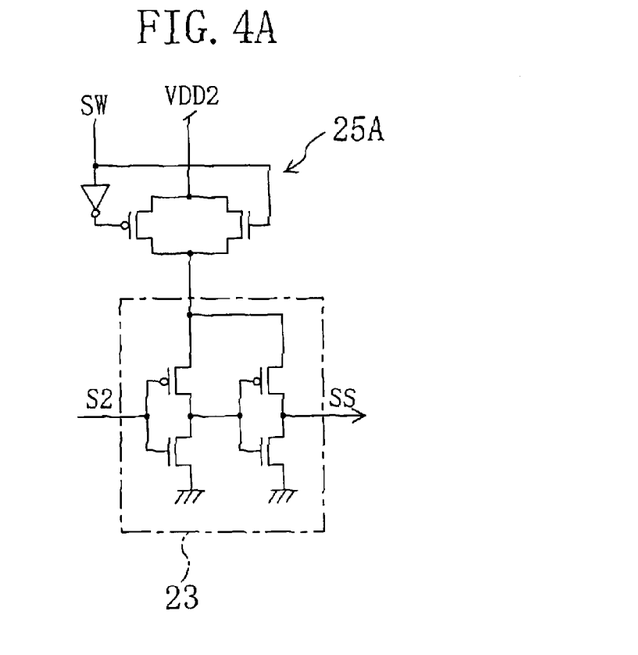
FIG. 4A and FIG. 4B are circuit diagrams each showing a principal portion of another example of the structure of the network apparatus according to the present invention.
Figure 4B:
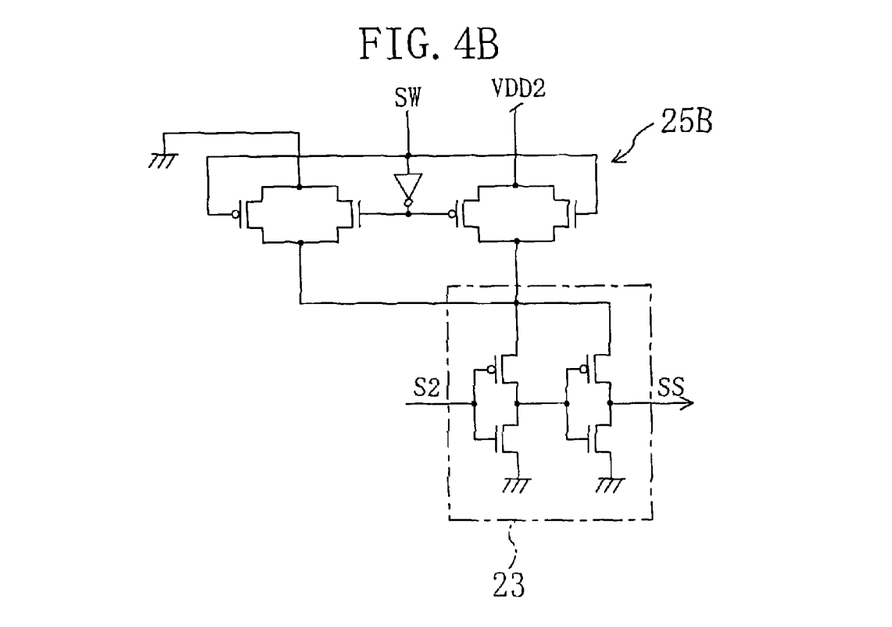

It is also possible to implement the present invention with a structure which switches between the presence and absence of the power supply to the driver for generating the intermediate potential. FIG. 4A and FIG. 4B are circuit diagrams of the peripheral portion of the driver in other examples of the structure of the network apparatus according to the present invention. Each of the structures of FIGS. 4A and 4B allows switching between the presence and absence of the power supply to the driver 23 in accordance with the switch signal SW. In the structure of FIG. 4A, a switch 25A as the loop interrupting means can prevent the power supply VDD2 from being supplied to the driver 23. In the structure of FIG. 4B, a switch 25B as the loop interrupting means can reduce the power supply VDD2 to the ground level. The switch SW is in the HIGH state during the normal operation, while it is in the LOW state when the power is OFF or during a reset.

Figure 5:
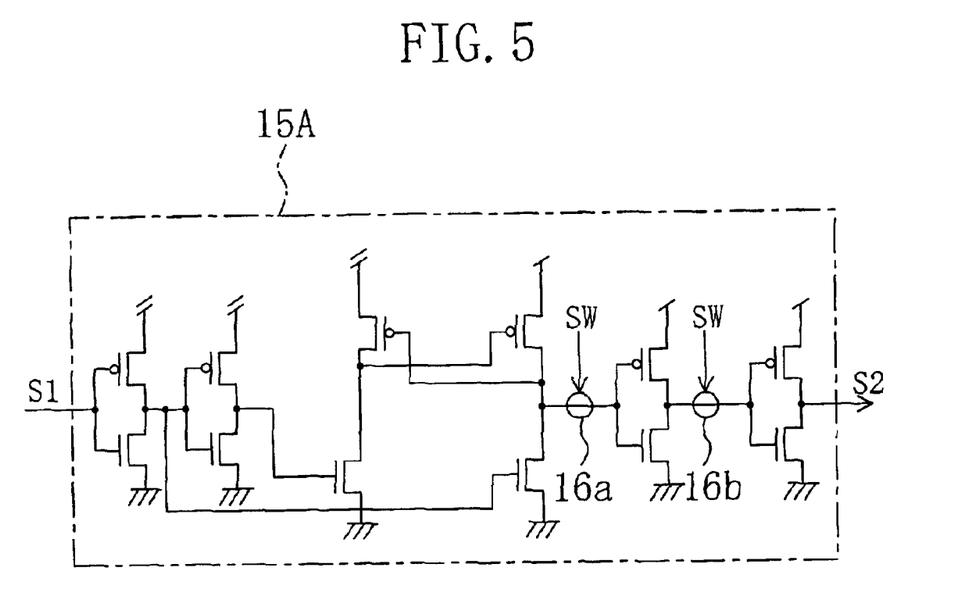
FIG. 5 is a circuit diagram showing a principal portion of still another example of the structure of the network apparatus according to the present invention.

Instead of providing the intermediate potential supply unit with a switch, it is also possible to internally provide the level converting unit with a switch. FIG. 5 is a circuit diagram of the level converting unit in another example of the structure of the network apparatus according to the present invention. In the structure of FIG. 5, it can be determined selectively whether the output control signal S2 outputted from the level converting unit 15A should be set to the ground potential or not in accordance with the switch signal SW by using switches 16a and 16b as the loop interrupting means. The circuits for the switches 16a and 16b can be constructed similarly to the circuit for the switch 22 shown in FIG. 2. It is also possible to provide either one of the switches 16a and 16b.

[Third Embodiment]

In contrast to the foregoing embodiments in which the reset signal RST is given as the switch signal SW from the outside, the present embodiment provides the intermediate potential supply unit with a potential detecting circuit for detecting the potential at the second power supply VDD2 and uses a potential detect signal outputted from the potential detecting circuit as the switch signal SW.

Figure 6:
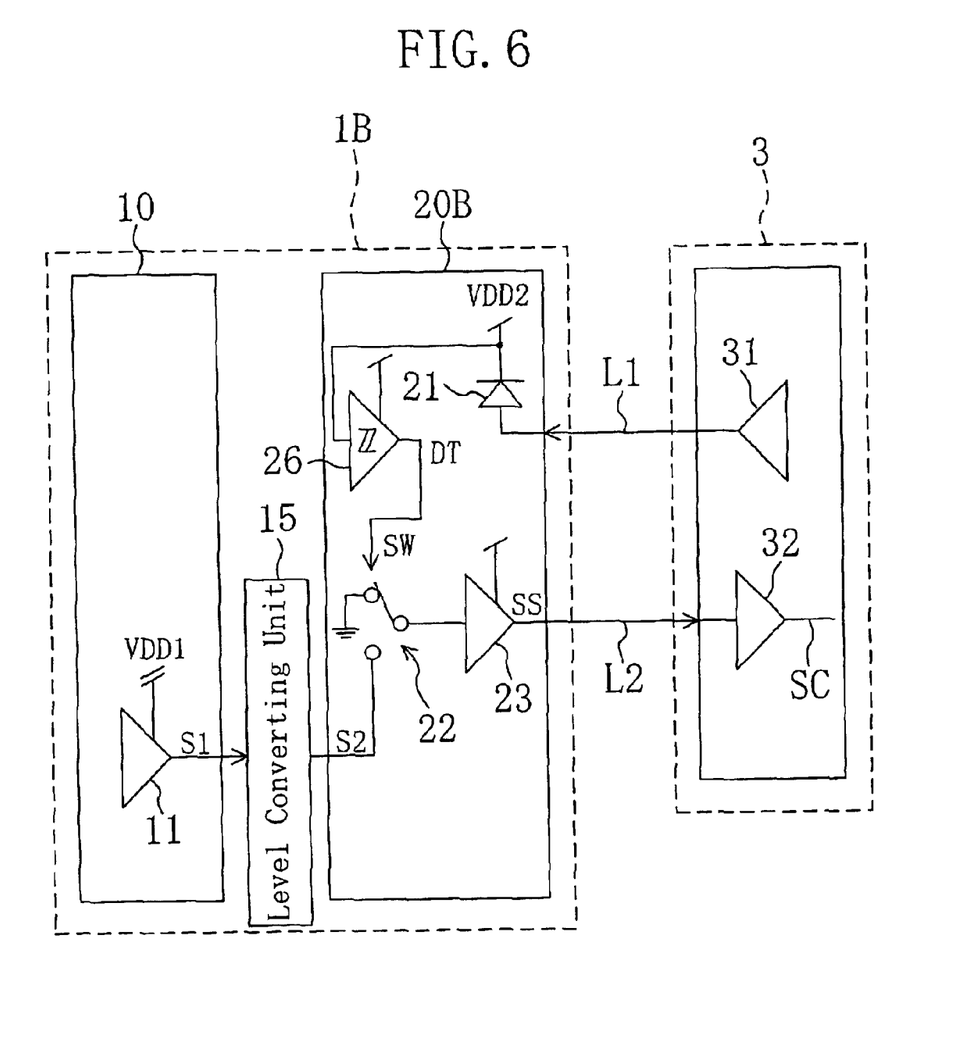
FIG. 6 is a circuit diagram showing a structure of a network apparatus according to a third embodiment of the present invention.

FIG. 6 shows a structure of a network apparatus according to a third embodiment of the present invention. The structure of FIG. 6 is different from the structure of FIG. 1 in that an intermediate potential supply unit 20B comprises a potential detecting circuit 26 for detecting the potential of the second power supply VDD2. The potential detecting circuit 26 enables a potential detect signal DT if the potential at the second power supply VDD2 becomes lower than, e.g., 1.8 V as a specified potential. The potential detect signal DT is given as the switch signal SW to the switch 22 instead of the reset signal RST.

In such a structure, if the potential at the second power supply VDD2 lowers, the potential detect signal DT is enabled and the output control signal S2 selectively outputted from the switch 22 is switched to the ground potential. Accordingly, the ground potential is supplied as the intermediate potential SS from the driver 23 to the second cable L2. This allows the second network apparatus 3 that has been connected to the first network apparatus 1 and disconnected therefrom to recognize the disconnection with reliability, similarly to the first and second embodiments.

Figure 7:
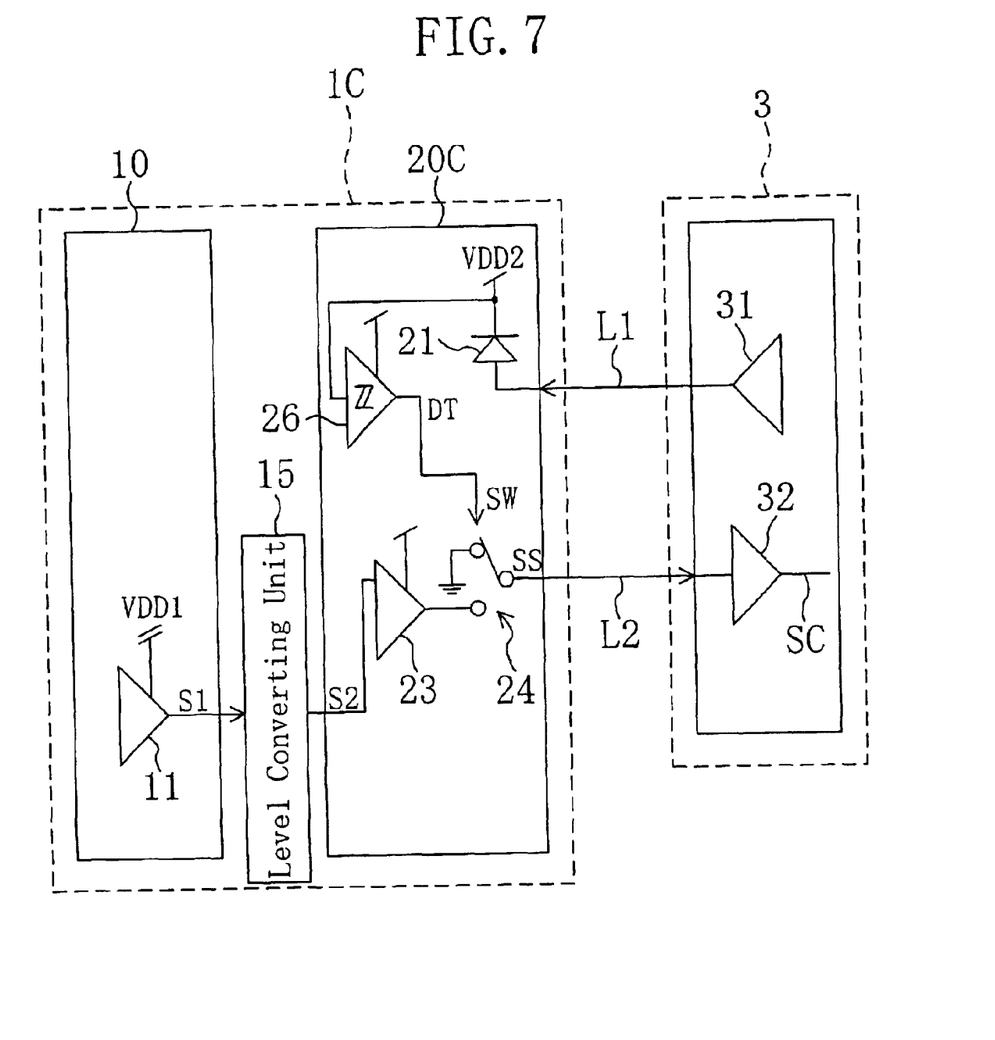
FIG. 7 is a circuit diagram showing another structure of the network apparatus according to the third embodiment.

It will easily be appreciated that the potential detect signal DT may also be given as the switch signal SW in the structure other than that shown in FIG. 1, similarly to FIG. 6. FIG. 7 shows a structure obtained by applying the present embodiment to the structure of FIG. 2. Similarly to FIG. 6, an intermediate potential supply unit 20C comprises the potential detecting circuit 26 for detecting the potential at the second power supply VDD2 and the potential detect signal DT outputted from the potential detecting circuit 26 is given as the switch signal SW to the switch 24, instead of the reset signal RST.

Thus, according to the present embodiment, it is unnecessary to give the reset signal indicative of the interruption of the power supply to the network apparatus so that the system has a simpler structure. However, the testing of the network apparatus can be conducted more easily with a structure in which the reset signal is given from the outside. If consideration is given to the ease of testing, there may be adopted a structure in which both of the potential detect signal generated in the inside and the reset signal supplied from the outside are used selectively as switch signals.

[Fourth Embodiment]

Figure 8:
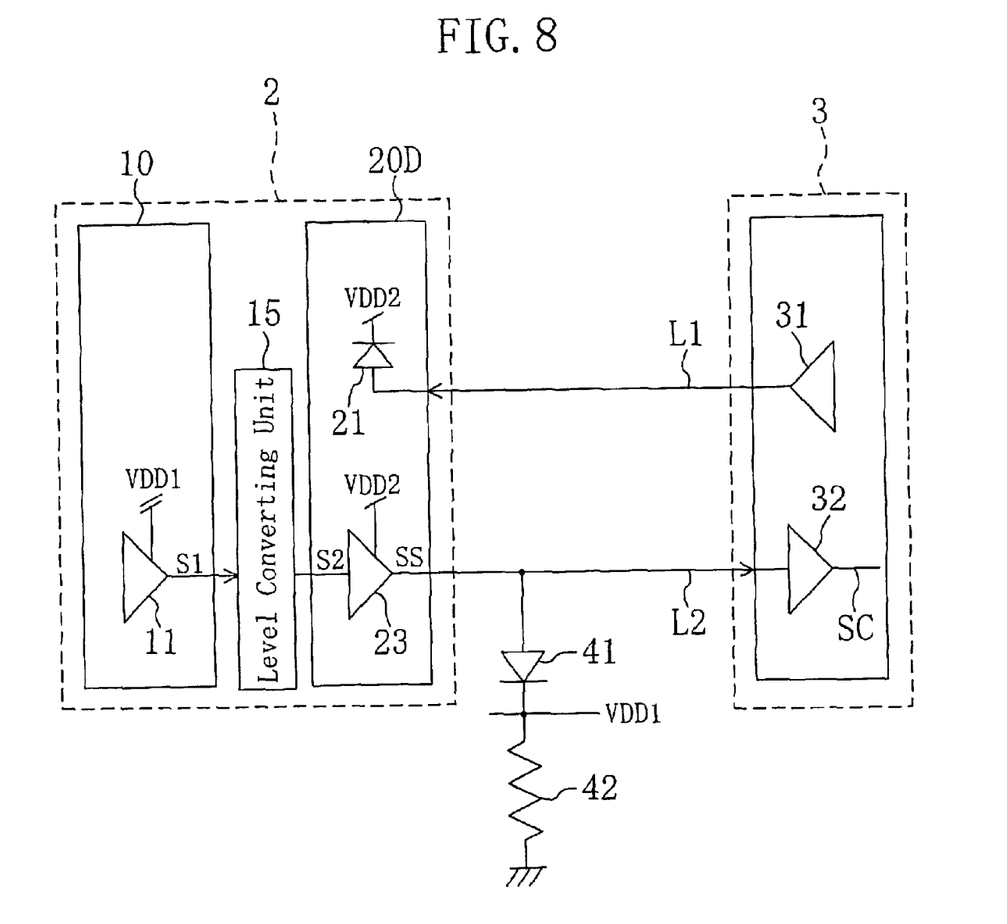
FIG. 8 is a circuit diagram showing a structure of a network apparatus according to a fourth embodiment of the present invention.

FIG. 8 shows a structure of a network apparatus according to a fourth embodiment of the present invention. In FIG. 8, reference numeral 2 denotes a first network apparatus corresponding to the network apparatus according to the present embodiment, 41 denotes a Schottky diode as a diode for providing connection between the second cable L2 and the first power supply VDD1, and 42 denotes a resistor provided between the first power supply VDD and the ground. The Schottky diode 41 and the resistor 42 constitute loop interrupting means.

Even if the intermediate potential supply unit 20D incurs a misoperation and the charge on the first cable L1 is supplied disadvantageously to the second cable L2 when the power supply to the first network apparatus 2 is interrupted, a potential reduction at the first power supply VDD1 allows the charge on the second cable L2 to be released to the first power supply VDD1 in the presence of the Schottky diode 41. As a result, the charge on the second cable L2 is consumed and the intermediate potential SS on the second cable L2 is eventually reduced to the ground potential. The resistor 42 prevents the first power supply VDD1 from floating with the supply of charge resulting from the misoperation of the intermediate potential supply unit 20D.

Thus, according to the present embodiment, the intermediate potential SS on the second cable L2 is forcibly reduced to the ground potential when the power supply to the network apparatus 2 is interrupted. This allows the second network apparatus 3 to recognize the disconnection with reliability.

Thus, according to the present invention, the intermediate potential to be supplied to the second cable is forcibly set to the ground potential when the power supply to the network apparatus of concern is interrupted. This allows the network apparatus that has been connected to the network apparatus of concern and disconnected therefrom to recognize the disconnection with reliability and interrupts the loop of power supply.

What is claimed is:

1. A network apparatus for receiving data via a first cable and transmitting data via a second cable, the apparatus comprising:
   a control unit operating with a first power supply and outputting a first signal;
   an intermediate potential supply unit operating with a second power supply, recognizing a level of an intermediate potential on the first cable, and supplying an intermediate potential to the second cable; and
   a level converting unit for converting a level of the first signal in accordance with respective voltage levels at the first and second power supplies and supplying, as a second signal, a resulting signal to the intermediate potential supply unit,
   the intermediate potential supply unit comprising:
   a switch for receiving the second signal and a ground potential and selectively outputting either one of the second signal and the ground potential in accordance with a switch signal; and
   a driver for generating the intermediate potential to be supplied to the second cable in accordance with an output from the switch.

2. The network apparatus of claim 1, wherein the switch receives a reset signal supplied from the outside of the network apparatus as the switch signal.

3. The network apparatus of claim 1, wherein the intermediate potential supply unit comprises: a potential detecting circuit for enabling a potential detect signal when a potential supplied from the second power supply is lower than a specified potential and the switch receives the potential detect signal as the switch signal.

4. A network apparatus for receiving data via a first cable and transmitting data via a second cable, the apparatus comprising:
   a control unit operating with a first power supply and outputting a first signal;
   an intermediate potential supply unit operating with a second power supply, recognizing a level of an intermediate potential on the first cable, and supplying an intermediate potential to the second cable; and
   a level converting unit for converting a level of the first signal in accordance with respective voltage levels at the first and second power supplies and supplying, as a second signal, a resulting signal to the intermediate potential supply unit,
   the intermediate potential supply unit comprising:
   a driver for generating a potential serving as the intermediate potential to be supplied to the second cable in accordance with the second signal; and
   a switch for receiving the potential generated by the driver and a ground potential and selectively outputting, as the intermediate potential to be supplied to the second cable, either one of the potential generated by the driver and the ground potential in accordance with a switch signal.

5. The network apparatus of claim 4, wherein the switch receives a reset signal supplied from the outside of the network apparatus as the switch signal.

6. The network apparatus of claim 4, wherein the intermediate potential supply unit comprises: a potential detecting circuit for enabling a potential detect signal when a potential supplied from the second power supply is lower than a specified potential and the switch receives the potential detect signal as the switch signal.

7. A network apparatus for receiving data via a first cable and transmitting data via a second cable, the apparatus comprising:
   a control unit operating with a first power supply and outputting a first signal;
   an intermediate potential supply unit operating with a second power supply, recognizing a level of an intermediate potential on the first cable, and supplying an intermediate potential to the second cable; and
   a level converting unit for converting a level of the first signal in accordance with respective voltage levels at the first and second power supplies and supplying, as a second signal, a resulting signal to the intermediate potential supply unit, the intermediate potential supply unit comprising:

a driver for generating the intermediate potential to be supplied to the second cable in accordance with the second signal; and a switch for switching between presence and absence of a power supply to the driver in accordance with a switch signal.

8. The network apparatus of claim 7, wherein the switch receives a reset signal supplied from the outside of the network apparatus as the switch signal.

9. The network apparatus of claim 7, wherein the intermediate potential supply unit comprises: a potential detecting circuit for enabling a potential detect signal when a potential supplied from the second power supply is lower than a specified potential and the switch receives the potential detect signal as the switch signal.

10. A network apparatus for receiving data via a first cable and transmitting data via a second cable, the apparatus comprising:

a control unit operating with a first power supply and outputting a first signal;

an intermediate potential supply unit operating with a second power supply, recognizing a level of an intermediate potential on the first cable, and supplying an intermediate potential to the second cable; and a level converting unit for converting a level of the first signal in accordance with respective voltage levels at the first and second power supplies and outputting, as a second signal serving as a basis for the intermediate potential to be supplied to the second cable, a resulting signal to the intermediate potential supply unit, the level converting unit comprising:

a switch for selectively setting the second signal to a ground potential in accordance with a switch signal.

11. The network apparatus of claim 10, wherein the switch receives a reset signal supplied from the ouside of the network apparatus as the switch signal.

12. The network apparatus of claim 10, wherein the intermediate potential supply unit comprises: a potential detecting circuit for enabling a potential detect signal when a potential supplied from the second power supply is lower than a specified potential and the switch receives the potential detect signal as the switch signal.

13. A network apparatus for receiving data via a first cable and transmitting data via a second cable, the apparatus comprising:

a control unit operating with a first power supply and outputting a first signal;

an intermediate potential supply unit operating with a second power supply, recognizing a level of an intermediate potential on the first cable, and supplying an intermediate potential to the second cable;

a level converting unit for converting a level of the first signal in accordance with respective voltage levels at the first and second power supplies and outputting, as a second signal serving as a basis for the intermediate potential to be supplied to the second cable, a resulting signal to the intermediate potential supply unit, a diode for coupling the second cable to the first power supply; and a resistor provided between the first power supply and the ground.

14. A network apparatus for receiving data via a first cable and transmitting data via a second cable, the apparatus comprising:

a control unit operating with a first power supply and outputting a first signal;

an intermediate potential supply unit operating with a second power supply, recognizing a level of an intermediate potential on the first cable, and supplying an intermediate potential to the second cable;

a level converting unit for converting a level of the first signal in accordance with respective voltage levels at the first and second power supplies and outputting, as a second signal serving as a basis for the intermediate potential to be supplied to the second cable, a resulting signal to the intermediate potential supply unit; and loop interrupting means for forcibly setting the intermediate potential to a ground potential if a power supply to the network apparatus is interrupted.

* * * * *